(12) United States Patent
Baek et al.

(10) Patent No.: US 10,725,339 B2
(45) Date of Patent: Jul. 28, 2020

(54) BACKLIGHT UNIT AND DISPLAY DEVICE HAVING THE SAME

(71) Applicant: SAMSUNG DISPLAY CO., LTD., Yongin-Si, Gyeonggi-Do (KR)

(72) Inventors: Seungin Baek, Seongnam-Si (KR); Jinho Park, Suwon-Si (KR); Sujin Choi, Seoul (KR); Mira Gwon, Daejeon (KR); Youngeun Park, Seoul (KR); Seon-Tae Yoon, Seoul (KR); Kwangkeun Lee, Osan-Si (KR); Junghwan Yi, Hwaseong-Si (KR); Younho Han, Seoul (KR)

(73) Assignee: SAMSUNG DISPLAY CO., LTD., Yongin-Si, Gyeonggi-Ro (KR)

( * ) Notice: Subject to any disclaimer, the term of this patent is extended or adjusted under 35 U.S.C. 154(b) by 0 days.

(21) Appl. No.: 16/358,153

(22) Filed: Mar. 19, 2019

(65) Prior Publication Data

US 2019/0302535 A1 Oct. 3, 2019

(30) Foreign Application Priority Data

Mar. 29, 2018 (KR) .................. 10-2018-0036787

(51) Int. Cl.
*G02F 1/133* (2006.01)
*G02F 1/13357* (2006.01)
(Continued)

(52) U.S. Cl.
CPC ...... *G02F 1/133611* (2013.01); *G02B 6/0028* (2013.01); *G02F 1/133524* (2013.01); *G02F 1/133606* (2013.01); *G02F 1/133615* (2013.01)

(58) Field of Classification Search
CPC .... G02B 6/005; G02B 6/0055; G02B 6/0028; G02F 1/133611; G02F 1/133524; G02F 1/133606; G02F 1/133615
See application file for complete search history.

(56) References Cited

U.S. PATENT DOCUMENTS 7,163,331 B2 1/2007 Suzuki et al.
7,991,257 B1 * 8/2011 Coleman ............ B29D 11/0073
264/1.24
(Continued)

FOREIGN PATENT DOCUMENTS

JP 4142016 8/2008
JP 2013165411 6/2013
(Continued)

*Primary Examiner* — Anne M Hines
(74) *Attorney, Agent, or Firm* — F. Chau & Associates, LLC

(57) ABSTRACT

A display device includes a display panel, a light guide plate disposed under the display panel, a light source disposed adjacent to one side surface of the light guide plate that generates a first light, a first refractive layer disposed between the light source and the one side surface of the light guide plate that has a refractive index greater than a refractive index of the light guide plate, and a second refractive layer disposed between the display panel and the light guide plate that has a refractive index less than the refractive index of the light guide plate. The first refractive layer includes a convex portion that protrudes into the one side surface of the light guide plate.

20 Claims, 12 Drawing Sheets

(51) Int. Cl.
*F21V 8/00* (2006.01)
*G02F 1/1335* (2006.01)

(56) References Cited

U.S. PATENT DOCUMENTS

| | | | | | |
|---|---|---|---|---|---|
| 2002/0163790 | A1* | 11/2002 | Yamashita | ............ | G02B 5/045 |
| | | | | | 362/612 |
| 2006/0146573 | A1 | 7/2006 | Iwauchi et al. | | |
| 2009/0297090 | A1* | 12/2009 | Bogner | ................ | G02B 6/0018 |
| | | | | | 385/14 |
| 2014/0022816 | A1* | 1/2014 | Iwasaki | ................ | G02B 6/0041 |
| | | | | | 362/606 |
| 2016/0147006 | A1 | 5/2016 | Large | | |

FOREIGN PATENT DOCUMENTS

| | | |
|---|---|---|
| JP | 2013156293 | 8/2013 |
| JP | 2017068248 | 4/2017 |
| KR | 1020080094676 | 10/2008 |
| KR | 020170086110 | 7/2017 |
| KR | 1020170099011 | 8/2017 |
| KR | 1020190058743 | 5/2019 |

\* cited by examiner

BACKLIGHT UNIT AND DISPLAY DEVICE HAVING THE SAME

CROSS-REFERENCE TO RELATED APPLICATION

This U.S. non-provisional patent application claims priority under 35 U.S.C. § 119 from, and the benefit of, Korean Patent Application No. 10-2018-0036787, filed on Mar. 29, 2018 in the Korean Intellectual Property Office, the contents of which are herein incorporated by reference in their entirety.

BACKGROUND

1. Technical Field

Embodiments of the present disclosure are directed to a backlight unit and a display device having the backlight unit.

2. Discussion of the Related Art

In general, a display device includes a display panel that displays an image using a light and a backlight unit disposed at a rear side of the display panel to provide the light to the display panel. The backlight unit includes a light source that generates the light and a light guide plate that guides the light to the display panel. The light source is disposed adjacent to one side surface of the light guide plate to provide the light to a light incident portion on one side surface of the light guide plate.

The light that is incident into the light guide plate is totally reflected by an upper surface of the light guide plate that is adjacent to the light incident portion and propagates to an opposite portion that faces the light incident portion of the light guide plate. The totally reflected light is diffused by diffusion patterns disposed on a lower surface of the light guide plate. However, some light leaks through the upper surface of the light guide plate without being totally reflected, which deteriorates light efficiency.

SUMMARY

Embodiments of the present disclosure provide a backlight unit that prevents light from leaking through an upper surface of a light guide plate that is adjacent to a light incident portion of the light guide plate.

Embodiments of the present disclosure provide a display device that includes the backlight unit.

Embodiments of the inventive concept provide a display device that includes a display panel, a light guide plate disposed under the display panel, a light source disposed adjacent to one side surface of the light guide plate that generates a first light, a first refractive layer disposed between the light source and the one side surface of the light guide plate that has a refractive index greater than a refractive index of the light guide plate, and a second refractive layer disposed between the display panel and the light guide plate that has a refractive index less than the refractive index of the light guide plate. The first refractive layer includes a convex portion that protrudes into the one side surface of the light guide plate.

Embodiments of the inventive concept provide a display device that includes a display panel, a light guide plate disposed under the display panel that includes an upper surface, a lower surface, one side surface, and an inclination surface that connects an upper end of the one side surface to the upper surface, a low refractive layer disposed on the upper surface of the light guide plate between the display panel and the light guide plate that has a refractive index less than a refractive index of the light guide plate, and a light source disposed adjacent to the one side surface of the light guide plate that generates a first light. The one side surface has a height in the third direction that is less than a distance between the upper surface and the lower surface, and an inclination angle θs between the upper surface and the inclination surface is determined by the following Equations of θc=sin$^{-1}$(n1/n2), θ'c=sin$^{-1}$(n3/n2) and θs=((θc+θ'c)/2)+(π/4), wherein "n1" denotes a refractive index of an air layer, "n2" denotes the refractive index of the light guide plate, and "n3" denotes the refractive index of the low refractive layer.

Embodiments of the inventive concept provide a backlight unit that includes a light guide plate that includes one side surface with a concave shaped recess, a light source disposed adjacent to one side surface of the light guide plate that generates a first light, a first refractive layer disposed between the light source and the one side surface of the light guide plate that has a refractive index greater than a refractive index of the light guide plate, and a second refractive layer disposed on the light guide plate that has a refractive index less than the refractive index of the light guide plate. The first refractive layer includes a convex portion that protrudes into concave shaped recess of the one side surface of the light guide plate.

According to the above, a first refractive layer that has a refractive index greater than that of the light guide plate and that includes a convex portion is disposed on one side surface of the light guide plate, and thus light incident to an upper surface of the light guide plate that is adjacent to a light incident portion of the light guide plate is totally reflected by the upper surface of the light guide plate. Accordingly, light efficiency can be improved.

DETAILED DESCRIPTION

Figure 1:
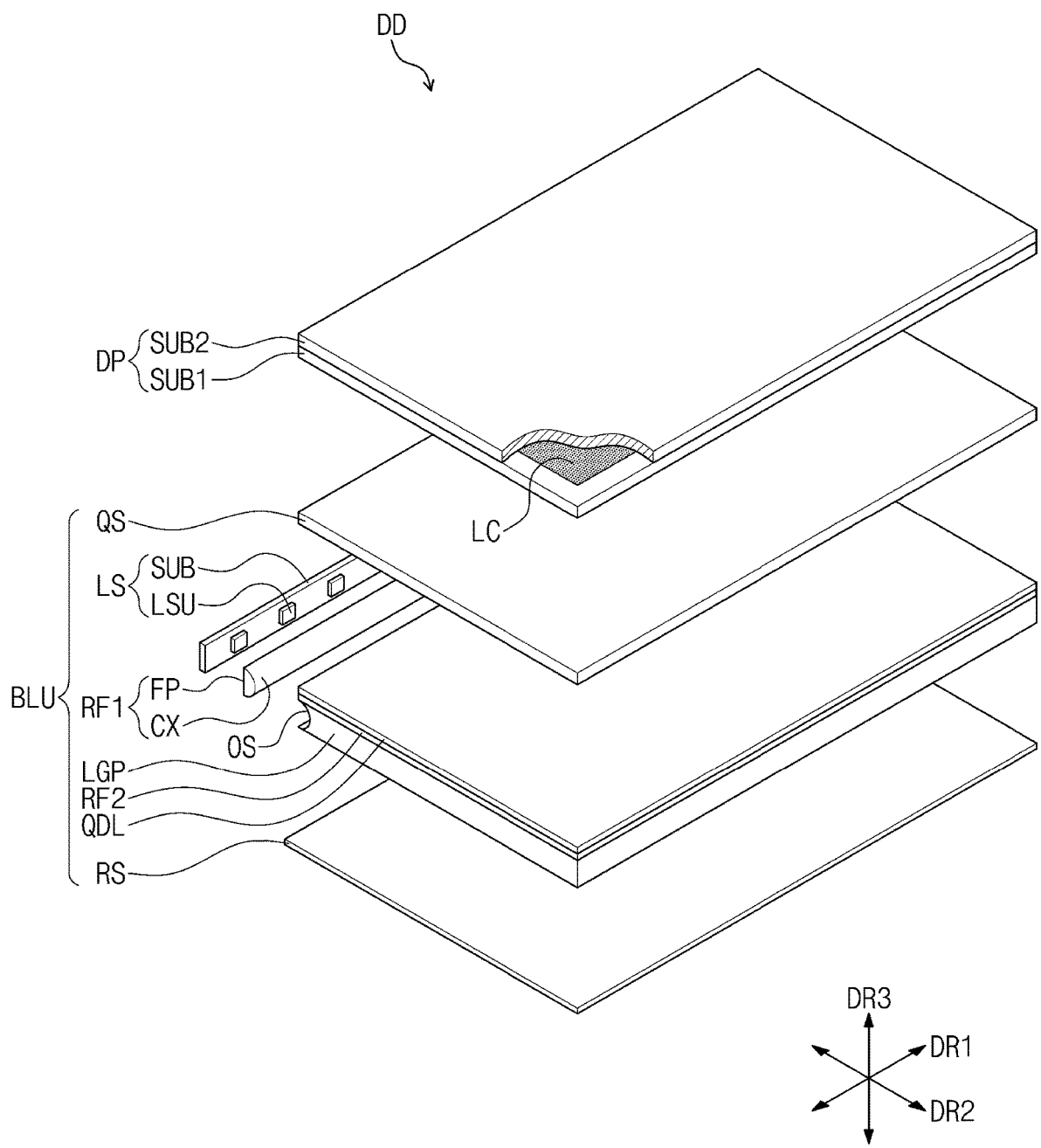
FIG. 1 is an exploded perspective view of a display device according to an exemplary embodiment of the present disclosure.

Features of embodiments of the inventive concept and methods of accomplishing the same may be understood more readily by reference to the following detailed description of exemplary embodiments and the accompanying drawings. Embodiments of the inventive concept may, however, be embodied in many different forms and should not be construed as being limited to the embodiments set forth herein. Like reference numerals may denote like elements throughout the specification.

It will be understood that when an element or layer is referred to as being "on", "connected to" or "coupled to" another element or layer, it can be directly on, connected or coupled to the other element or layer or intervening elements or layers may be present.

Exemplary embodiments are described herein with reference to plan views and cross-sectional views that are schematic illustrations of idealized exemplary embodiments. As such, variations from the shapes of the illustrations as a result, for example, of manufacturing techniques and/or tolerances, are to be expected. Thus, exemplary embodiments should not be construed as limited to particular shapes of regions illustrated herein but are to include deviations in shapes that result, for example, from manufacturing. Thus the regions illustrated in the figures are schematic in nature and their shapes are not intended to illustrate the actual shape of a region of a device and are not intended to limit the scope of the exemplary embodiments.

Hereinafter, embodiments of the present invention will be explained in detail with reference to the accompanying drawings.

FIG. 1 is an exploded perspective view of a display device DD according to an exemplary embodiment of the present disclosure.

Referring to FIG. 1, the display device DD according to an present exemplary embodiment includes a display panel DP that displays an image using light and a backlight unit BLU that generates light and provides the light to the display panel DP. The backlight unit BLU is disposed at a rear side of the display panel DP to provide the light to the display panel DP.

According to an embodiment, the display panel DP includes a plurality of pixels that display the image using the light. The display panel DP may be, but is not limited to, a liquid crystal display panel. For example, the display panel DP includes a first substrate SUB1 on which the pixels are disposed, a second substrate SUB2 that faces the first substrate SUB1, and a liquid crystal layer LC disposed between the first substrate SUB1 and the second substrate SUB2. However, the display panel DP is not limited to a liquid crystal display panel. That is, the display panel DP can be an electrophoretic display panel or an electrowetting display panel, which display an image using light.

According to an embodiment, the backlight unit BLU generates a first light and converts the first light to a second light and provides the display panel DP with the second light. In the above descriptions, the light provided to the display panel DP is the second light. The first light is a blue light, and the second light is a white light. The backlight unit BLU is an edge-type backlight unit. The backlight unit BLU includes a light source LS, a light guide plate LGP, a first refractive layer RF1, a second refractive layer RF2, a light conversion layer QDL, an optical sheet QS, and a reflection sheet RS.

According to an embodiment, the display panel DP, the optical sheet QS, the light guide plate LGP, the second refractive layer RF2, the light conversion layer QDL, and the reflection sheet RS have a rectangular shape with long sides in a first direction DR1 and short sides in a second direction DR2 that crosses the first direction DR1. Hereinafter, a direction that substantially vertically crosses a plane defined by the first and second directions DR1 and DR2 is a third direction DR3.

According to an embodiment, the light source LS faces one side surface OS of the light guide plate LGP, which is one of the long sides. The light source LS extends in the first direction DR1. The light source LS generates the first light, and the first light is provided to the one side surface OS of the light guide plate LGP. The one side surface OS of the light guide plate LGP is referred to hereinafter as a "light incident portion", and a side surface opposite to the one side surface OS of the light guide plate LGP is referred to hereinafter as an "opposite portion".

According to an embodiment, the light source LS includes a light source substrate SUB that extends in the first direction DR1 and a plurality of light source units LSU disposed on the light source substrate SUB. The light source units LSU are spaced apart in the first direction DR1 at regular intervals. The light source units LSU face the one side surface OS of the light guide plate LGP. The light source units LSU generate the first light, and the first light generated by the light source units LSU is provided to the one side surface OS of the light guide plate through the first refractive layer RF1.

According to an embodiment, the first refractive layer RF1 is disposed between the light source LS and the one side surface OS of the light guide plate LGP. The first refractive layer RF1 has a refractive index greater than that of the light guide plate LGP. For example, the refractive index of the light guide plate LGP is about 1.5, and the refractive index of the first refractive layer RF1 is about 1.8. The first refractive layer RF1 extends in the first direction DR1 along the one side surface OS of the light guide plate LGP.

According to an embodiment, when viewed in the first direction DR1, a side surface of the first refractive layer RF1 has a semi-circular shape in a cross section. The first refractive layer RF1 includes a convex portion CX that convexly protrudes toward the one side surface OS of the light guide plate LGP and a flat portion FP that is a surface opposite to the convex portion CX. The flat portion FP extends in the first direction DR1 and has a flat surface substantially parallel to the first and third directions DR1 and DR3. The light source units LSU face the flat portion FP.

According to an embodiment, the light guide plate LGP includes a plastic and is disposed under the display panel DP. Upper and lower surfaces of the light guide plate LGP are parallel to the first and second directions DR1 and DR2. The light guide plate LGP is disposed under the second refractive layer RF2, and the one side surface OS of the light guide plate LGP has a concave shape that corresponds to the convex portion CX of the first refractive layer RF1. For example, a concave recess is formed in the one side surface OS of the light guide plate LGP, and a curvature of the convex portion CX is equal to a curvature of the concave recess of the one side portion OS. The convex portion CX is inserted into the recess of the one side surface OS to make contact with the recessed one side surface OS.

According to an embodiment, the first light generated by the light source units LSU propagates to the first refractive layer RF1 and is refracted at a boundary surface between the first refractive layer RF1 and an air layer disposed between the light source LS and the first refractive layer RF1. The refracted first light propagates to the light guide plate LGP through the first refractive layer RF1. The light guide plate LGP changes a propagation direction of the first light received through first refractive layer RF1 to an upward direction toward the display panel DP.

According to an embodiment, the second refractive layer RF2 is disposed on the light guide plate LGP and between the display panel DP and the light guide plate LGP. Accordingly, the second refractive layer RF2 faces the upper surface of the light guide plate LGP. The second refractive layer RF2 has a refractive index less than that of the light guide plate LGP. For example, the second refractive layer RF2 has the refractive index of about 1.25.

According to an embodiment, since the second refractive layer RF2 is disposed on the light guide plate LGP and has a low refractive index, a total reflection can occur at a boundary surface between the light guide plate LGP and the second refractive layer RF2. If the second refractive layer RF2 has a refractive index greater than that of the light guide plate LGP, total reflection does not occur. The first light exiting upward from the upper surface of the light guide plate LGP without being totally reflected by the boundary surface between the light guide plate LGP and the second refractive layer RF2 propagates into the second refractive layer RF2 after being refracted at the boundary surface between the second refractive layer RF2 and the light guide plate LGP.

According to an embodiment, the light conversion layer QDL is disposed between the display panel DP and the second refractive layer RF2. The first light exiting upward from the second refractive layer RF2 propagates to the light conversion layer QDL. The light conversion layer QDL converts the first light to the second light, and the second light exits upward. For example, the first light generated by the light source units LSU is blue light, and the light conversion layer QDL converts the blue light into white light that corresponds to the second light.

According to an embodiment, the light conversion layer QDL includes a plurality of quantum dots that convert the blue light into white light. The second light exiting from the light conversion layer QDL propagates to the optical sheet QS. The light conversion layer QDL has a refractive index greater than the refractive index of the second refractive layer RF2. For example, the light conversion layer QDL has a refractive index of about 1.6.

According to an embodiment, the optical sheet QS is disposed between the display panel DP and the light conversion layer QDL. The optical sheet QS includes a diffusion sheet and a prism sheet disposed above the diffusion sheet. The diffusion sheet diffuses the second light received from the light conversion layer QDL. The prism sheet condenses the second light diffused by the diffusion sheet in an upward direction vertical to a plane surface. The second light exiting from the prism sheet propagates upward to the display panel DP with a uniform luminance distribution.

According to an embodiment, the reflection sheet RS is disposed under the light guide plate LGP. The reflection sheet RS reflects upward first light that leaks downward from the light guide plate LGP.

Figure 2:
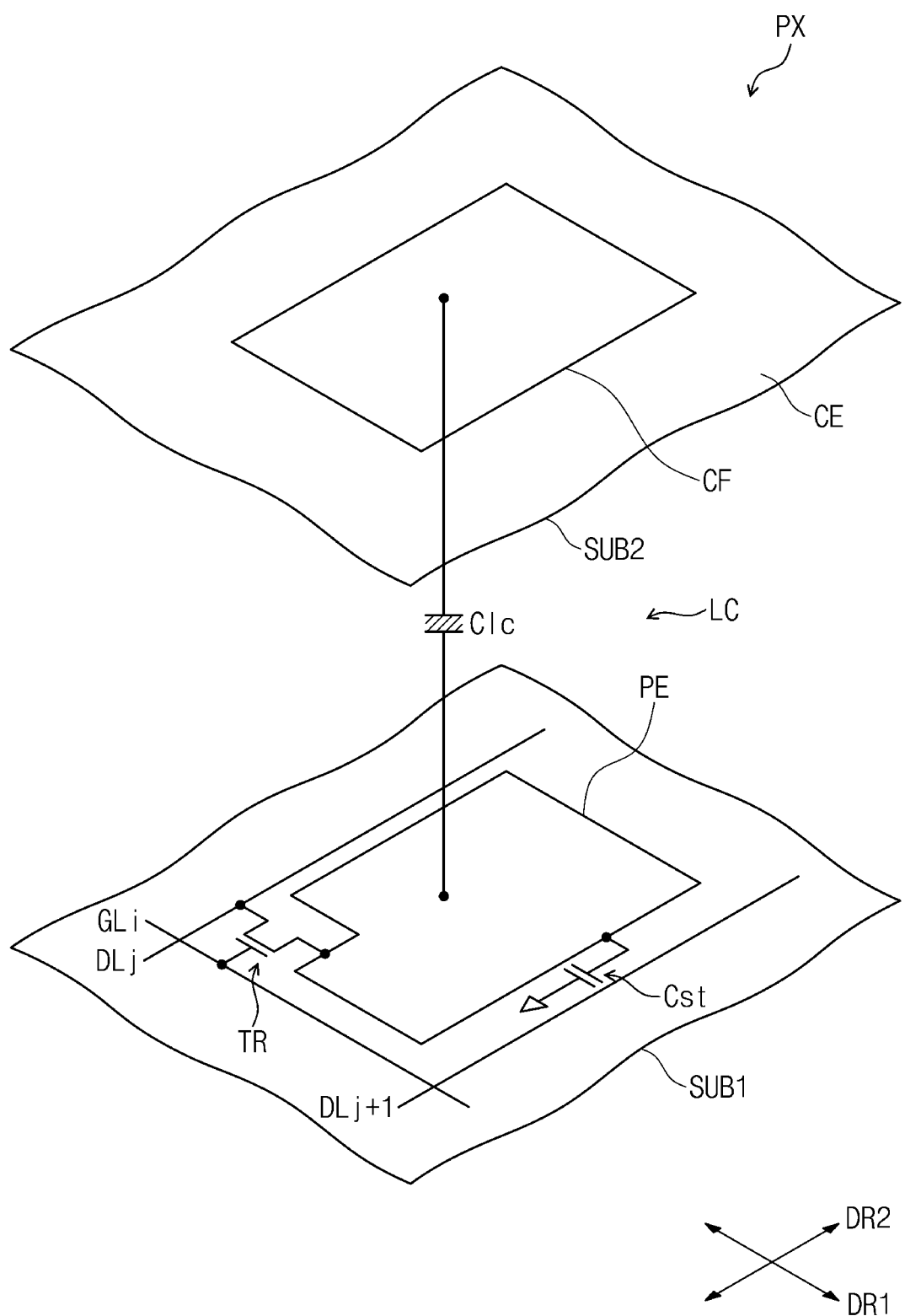
FIG. 2 illustrates a pixel disposed in a display panel shown in FIG. 1.

FIG. 2 illustrates a pixel PX disposed in the display panel DP shown in FIG. 1.

For convenience of explanation, FIG. 2 shows one pixel PX connected to a gate line GLi and a data line DLj. Other pixels PX in the display panel DP have the same configuration as that of the pixel PX shown in FIG. 2.

Referring to FIG. 2, according to an embodiment, the pixel PX includes a transistor TR connected to the gate line GLi and the data line DLj, a liquid crystal capacitor Clc connected to the transistor TR, and a storage capacitor Cst connected to the liquid crystal capacitor Clc in parallel. The storage capacitor Cst may be omitted. Each of "i" and "j" is a natural number.

According to an embodiment, the transistor TR is disposed on the first substrate SUB1. The transistor TR includes a gate electrode connected to the gate line GLi, a source electrode connected to the data line DLj, and a drain electrode connected to the liquid crystal capacitor Clc and the storage capacitor Cst.

According to an embodiment, the liquid crystal capacitor Clc includes a pixel electrode PE disposed on the first substrate SUB1, a common electrode CE disposed on the second substrate SUB2, and the liquid crystal layer LC disposed between the pixel electrode PE and the common electrode CE. The liquid crystal layer LC is a dielectric substance. The pixel electrode PE is connected to the drain electrode of the transistor TR.

According to an embodiment, the storage capacitor Cst includes the pixel electrode PE, a storage electrode that branches from a storage line, and an insulating layer disposed between the pixel electrode PE and the storage electrode. The storage line is disposed on the first substrate SUB1 and is substantially simultaneously formed with the gate line GLi on the same layer. The storage electrode partially overlaps the pixel electrode PE.

According to an embodiment, the pixel PX further includes a color filter CF displaying one of red, green, or blue. The color filter CF may be disposed on the second substrate SUB2 as shown in FIG. 2. However, according to other embodiments, the color filter CF may be disposed on the first substrate SUB1.

According to an embodiment, the transistor TR is turned on in response to a gate signal applied thereto through the gate line GLi. A data voltage provided through the data line DLj is transmitted to the pixel electrode PE of the liquid crystal capacitor Clc through the turned-on transistor TR. The common electrode CE receives a common voltage.

According to an embodiment, due to a difference in voltage level between the data voltage and the common voltage, an electric field is formed between the pixel electrode PE and the common electrode CE. Liquid crystal molecules of the liquid crystal layer LC are driven by the electric field formed between the pixel electrode PE and the common electrode CE.

According to an embodiment, the storage line receives a storage voltage with a constant voltage level, however, embodiments are not limited thereto. That is, the storage line may receive the common voltage. The storage capacitor Cst compensates for the voltage charged in the liquid crystal capacitor Clc.

Figure 3:
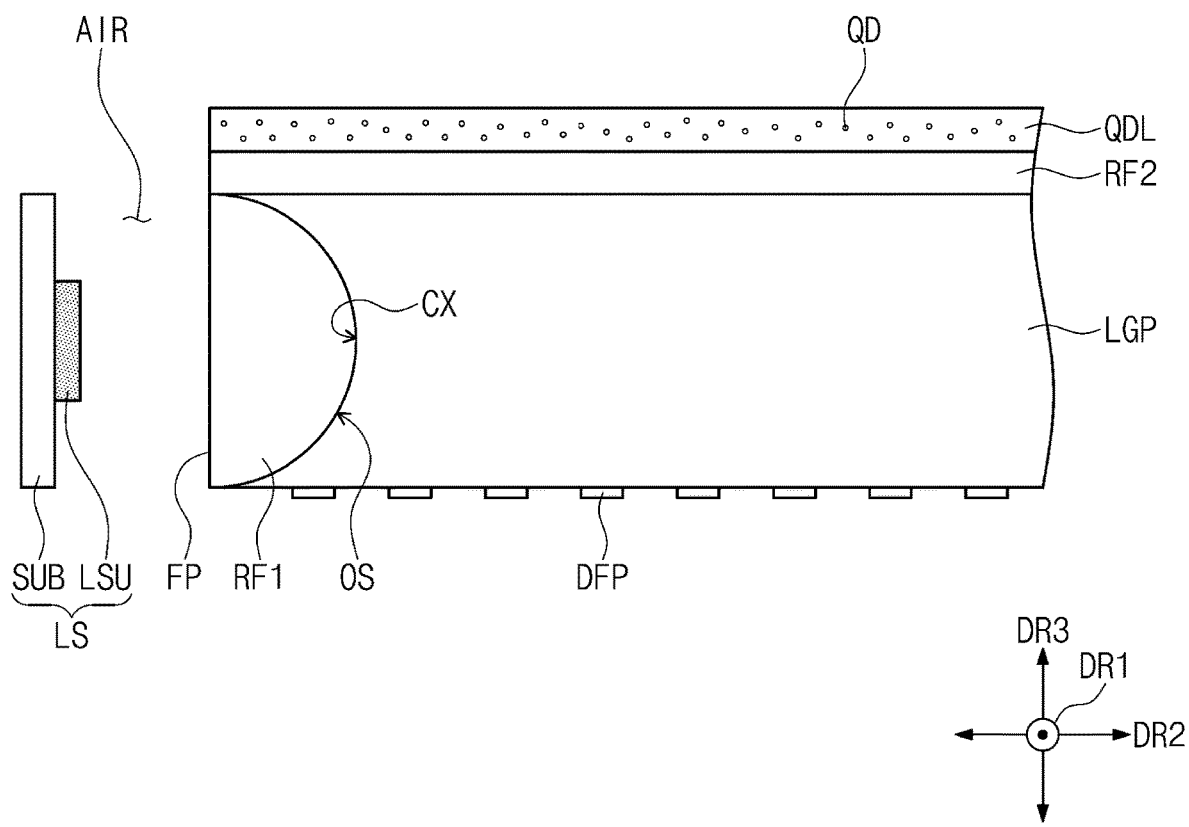
FIG. 3 is an enlarged cross-sectional view of a side surface of a light guide plate shown in FIG. 1.
Figure 4:
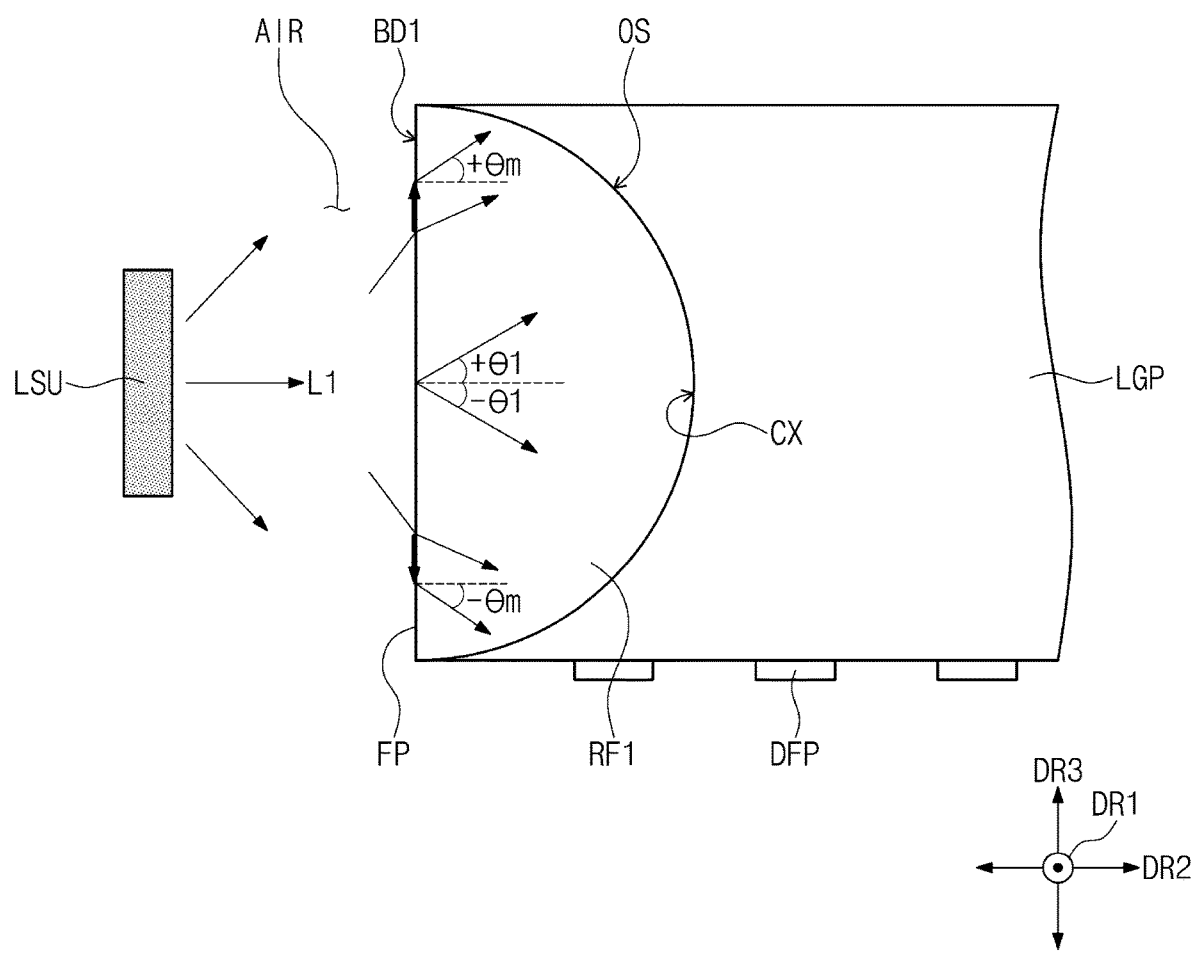
FIG. 4 illustrates an example of refraction of a first light in a first refractive layer.

FIG. 3 is an enlarged cross-sectional view of the one side surface of the light guide plate LGP shown in FIG. 1, and FIG. 4 illustrates an example of refraction of the first light in the first refractive layer RF1.

Referring to FIG. 3, according to an embodiment, the first refractive layer RF1 is inserted into the one side surface OS of the light guide plate LGP, which is a concave recess. In detail, the convex portion CX of the first refractive layer RF1 is inserted into the recess of the one side surface OS of the light guide plate LGP and disposed in the recess to make contact with the one side surface OS of the light guide plate LGP. A plurality of diffusion patterns DFP are disposed on the lower surface of the light guide plate LGP.

According to an embodiment, a distance in the third direction DR3 between an upper end and a lower end of the flat portion FP is equal to a distance in the third direction DR3 between the upper surface and the lower surface of the light guide plate LGP. That is, a maximum thickness of the first refractive layer RF1 is equal to the thickness of the light guide plate LGP. The flat portion FP is coplanar with one side surface of the second refractive layer RF2 and one side surface of the light conversion layer QDL.

According to an embodiment, the light conversion layer QDL includes the quantum dots QD that convert the first light into second light. The light conversion layer QDL includes quantum dots QD that generate white light have different sizes from each other, depending on the type of the light source LS. For example, when the light source LS generates blue light, the light conversion layer QDL includes quantum dots QD that have a size that absorbs blue light and emits green light and quantum dots QD that have a size that absorbs blue light and emits red light.

According to an embodiment, the quantum dots QD absorb blue light that corresponds to the first light and emits green or red light. In addition, a portion of the blue light is not absorbed by the quantum dots QD. Accordingly, red, green and blue light are mixed together in the light conversion layer QDL, and thus white light that corresponds to the second light is generated.

Referring to FIG. 4, according to an embodiment, the first light L1 generated by the light source LS propagates to the first refractive layer RF1. The air layer "AIR" between the light source LS and the first refractive layer RF1 has a refractive index of about 1.0, and the first refractive layer RF1 has a refractive index of about 1.8.

According to an embodiment, an incident angle and a refractive angle are determined with respect to a direction, such as a normal line direction, vertical to a boundary surface between media having different refractive indices. When light propagates to a medium having a relatively large refractive index from a medium having a relatively small refractive index, the incident angle is greater than the refractive angle. On the other hand, when light propagates to a medium having a relatively small refractive index from a medium having a relatively large refractive index, the refractive angle is greater than the incident angle. When light propagates to a medium having a relatively large refractive index from a medium having a relatively small refractive index, an incident angle of the light at which the light incident to the medium is totally reflected is defined as a "critical angle".

According to an embodiment, a normal line direction substantially vertical to a first boundary surface BD1 between the air layer AIR and the first refractive layer RF1 is substantially parallel to the second direction DR2. Although it is possible for light to propagate in a direction perpendicular to the second direction DR2 at the first boundary surface BD1, since the light source LS is spaced apart from the first refractive layer RF1 by a predetermined distance, the first light L1 emitted from the light source LS does not propagate perpendicular to the second direction DR2 at the first boundary surface BD1.

According to an embodiment, if the first light L1 propagates perpendicular to the second direction DR2 at the first boundary surface BD1, the first light L1 is refracted at ±the maximum refractive angle θm with respect to the second direction DR2 that depends on a difference in refractive indices between the air layer AIR and the first refractive layer RF1. When there is substantially no first light L1 propagating perpendicular to the second direction D2 at the first boundary surface BD1, the first light L1 refracted at the first boundary surface BD1 into the first refractive layer RF1 propagates at an angle that is less than +maximum refractive angle (+θm) and greater than −maximum refractive angle (−θm) with respect to the second direction DR2.

According to an embodiment, since the refractive index of the air layer AIR is about 1.0 and the refractive index of the first refractive layer RF1 is about 1.8, the maximum refractive angle θm is about 34 degrees. For example, the first light L1 propagates at an angle between about +first angle (+θ1) to about −first angle (+θ1), where a magnitude of the first angle (θ1) is less than a magnitude of the maximum refractive angle (θm).

Figure 5:
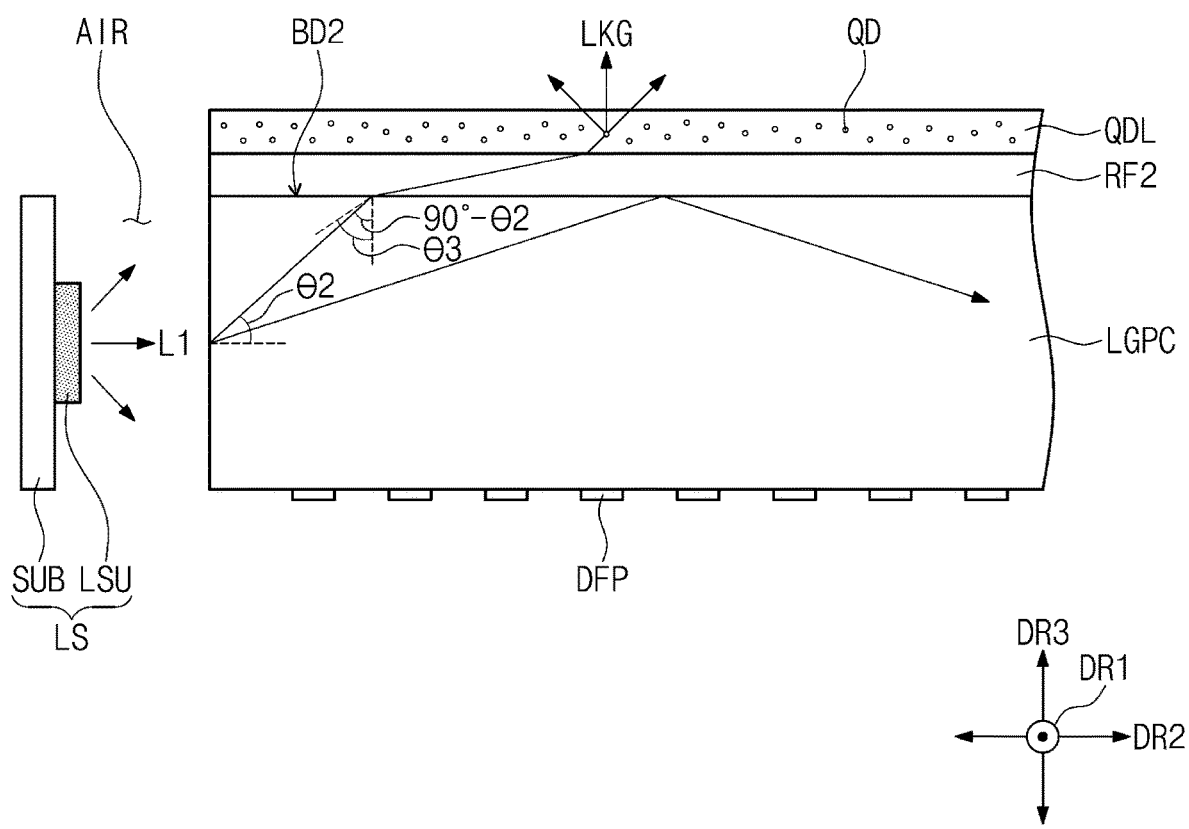
FIG. 5 illustrates an example of light refraction in a comparison light guide plate.
Figure 6:
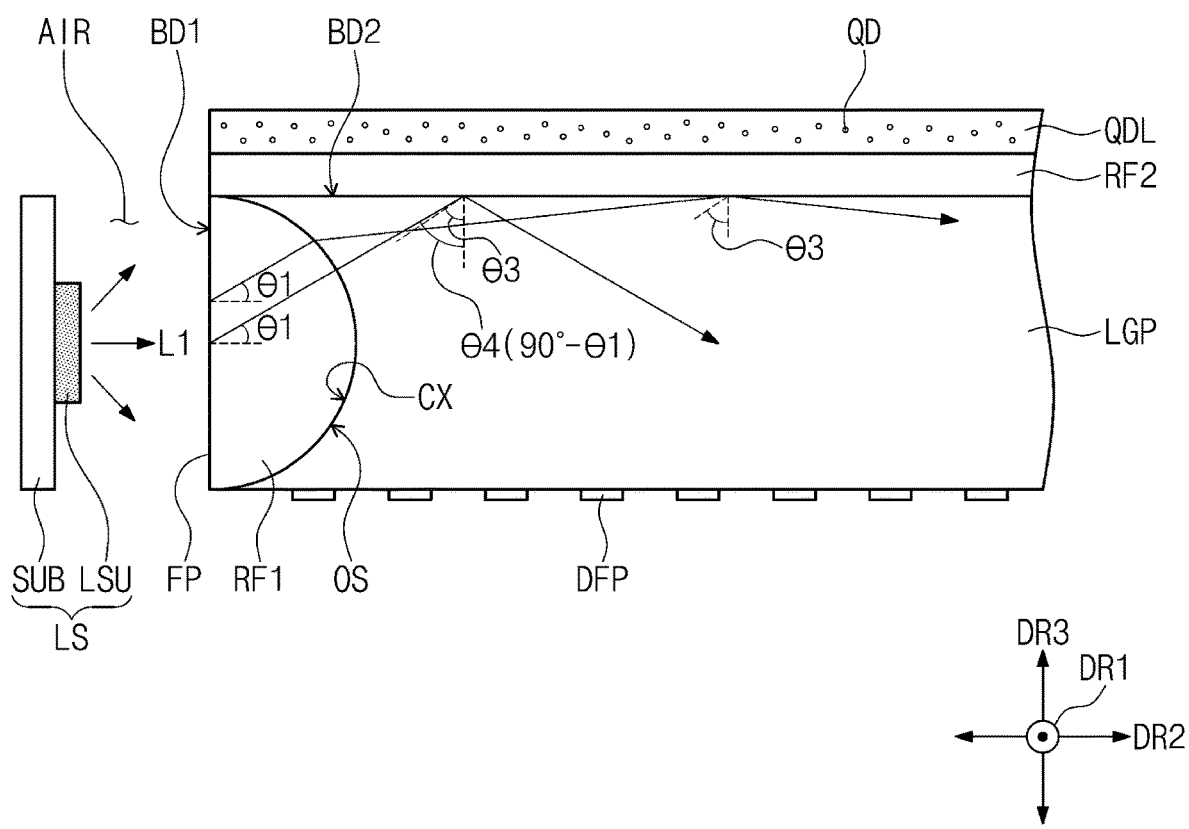
FIG. 6 illustrates an example of a refraction of a first light in a light guide plate shown in FIG. 1.
Figure 7:
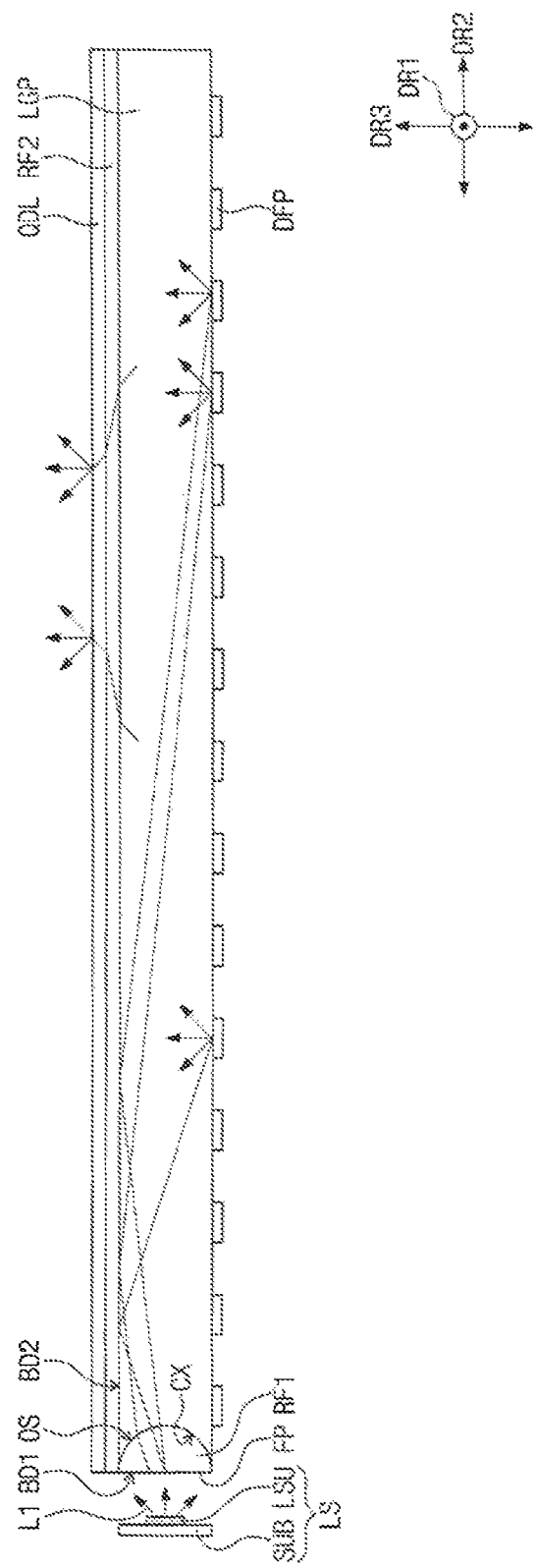
FIG. 7 illustrates an example of the operation of a light guide plate shown in FIG. 1.

FIG. 5 illustrates an example of light refraction in a comparison light guide plate LGPC. FIG. 6 illustrates an example of refraction of the first light in the light guide plate shown in FIG. 1. FIG. 7 illustrates an example of the operation of a light guide plate shown in FIG. 1.

Referring to FIG. 5, according to an embodiment, different from a light guide plate LGP according to an embodiment of the present disclosure, the comparison light guide plate LGPC does not include a concave side surface, and there is no first refractive layer RF1 disposed on a side surface of the comparison light guide plate LGPC.

A first light L1 emitted from a light source LS is refracted at a boundary surface between an air layer AIR and the comparison light guide plate LGPC and propagates into the comparison light guide plate LGPC. When the air layer AIR has a refractive index of about 1.0 and the comparison light guide plate LGPC has a refractive index of about 1.5, the first light L1 is refracted at a second angle θ2 less than a first angle θ1 with respect to the second direction DR2. A maximum refractive angle of the first light L1 is about 42 degrees at the boundary surface between the air layer AIR and the comparison light guide plate LGPC.

The first light L1 propagates to an upper surface of the comparison light guide plate LGPC and has an incident angle at a second boundary surface BD2 between the upper surface of the comparison light guide plate LGPC and a second refractive layer RF2 that is equal to 90 degrees minus the second angle θ2. A critical angle at which the first light L1 is totally reflected at the second boundary surface BD2 is represented by a third angle θ3. The incident angle of the first light L1 propagating to the upper surface of the comparison light guide plate LGPC is less than the third angle θ3.

Accordingly, the first light L1 propagates into the second refractive layer RF2 after being refracted through the second boundary surface BD2. For example, when the refractive index of the comparison light guide plate LGPC is about 1.5 and a refractive index of the second refractive layer RF2 is about 1.25, the third angle θ3 is about 56 degrees.

The incident angle of the first light L1 at a second boundary surface BD2 is greater than third angle θ3, and thus the first light L1 is totally reflected by the upper surface of the comparison light guide plate LGPC and propagates to an opposite portion of the comparison light guide plate LGPC, and the first light L1 is scattered by diffusion patterns DFP disposed on a lower surface of the comparison light guide plate LGPC and exits upward. However, as described above, the first light L1 may transmit through the upper surface of the comparison light guide plate LGPC without being totally reflected. In this case, since the first light L1 leaks, light efficiency is deteriorated by the leaked light LKG.

Referring to FIG. 6, according to an embodiment, as described with reference to FIG. 4, the first light L1 propagates in the first refractive layer RF1 at the first angle θ1 with respect to the second direction DR2. Since the convex portion CX has the convex surface, the first light L1 propagates at the first angle θ1 to the boundary surface between the convex portion CX and the one side surface and continues propagating into the light guide plate LGP after being refracted at an angle less than the first angle θ1 with respect to the second direction DR2.

According to an embodiment, a critical angle at which the first light L1 is totally reflected at the second boundary surface BD2 between the light guide plate LGP and the second refractive layer RF2 is a third angle θ3, and the first angle θ1 is less than the third angle θ3. Let an incident angle of the first light L1 propagating into the second boundary surface BD2 be a fourth angle θ4 (90°—θ1). If the fourth angle θ4 is greater than the third angle θ3, the first light L1 is totally reflected at the second boundary surface BD2.

Referring to FIG. 7, according to an embodiment, the first light L1 propagating into the light guide plate LGP is totally reflected at the upper surface of the light guide plate LGP. The first light L1 totally reflected at the upper surface of the light guide plate LGP is scattered by the diffusion patterns DFP disposed on the lower surface of the light guide plate LGP to propagate in an upward direction. As described above, light leaking downward from the light guide plate LGP is reflected by the reflection sheet RS and then propagates upward.

According to an embodiment, the first light L1 propagating upward is refracted at the second boundary surface BD2 into the second refractive layer RF2. The refractive angle of the first light L1 refracted at the second refractive layer RF2 is greater than the incident angle of the first light L1 propagating to the second refractive layer RF2. The first light L1 propagating into the light conversion layer QDL from the second refractive layer RF2 is converted to the second light L2 by quantum dots QD in the light conversion layer QDL. The quantum dots QD scatter the second light L2, and thus the second light L2 is substantially diffused.

In an embodiment of the present disclosure, since the first light L1 propagating into the light guide plate LGP can be totally reflected at the upper surface of the light guide plate LGP, the first light L1 does not leak through the upper surface of the light guide plate LGP.

Consequently, the display device DD according to an embodiment of the present disclosure prevents the first light L1 from leaking through the upper surface of the light guide plate LGP, and thus light efficiency is improved.

Figure 8:
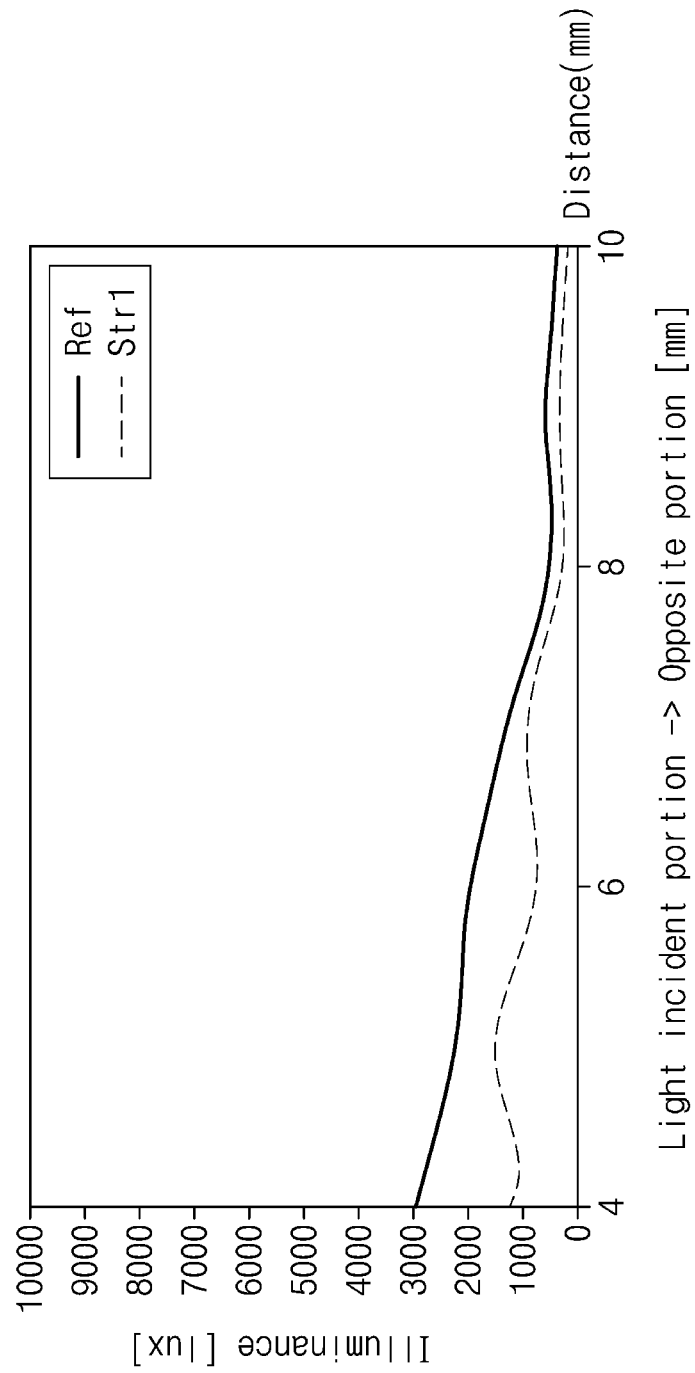
FIG. 8 is a graph that compares light leakage as a function of distance in a comparison light guide plate of a backlight unit that does not include a second refractive layer with a light guide plate of a backlight unit that includes the second refractive layer.

FIG. 8 is a graph that compares light leakage as a function of distance in a comparison light guide plate of a backlight unit that does not include a second refractive layer with a light guide plate of a backlight unit that includes the second refractive layer.

In FIG. 8, according to an embodiment, a horizontal axis represents a distance from the light incident portion of each of the light guide plates LGPC and LGP, and a vertical axis represents a luminance of the leaked light. A reference graph Ref is obtained by measuring light leakage in the comparison light guide plate LGPC, and a structure 1 graph Str1 is obtained by measuring the light leakage in a light guide plate LGP according to an embodiment of the disclosure.

When there are diffusion patterns DFP, light leakage may not be precisely measured. Since light leakage can be relatively precisely measured when there are no diffusion patterns DFP, light leakage was measured in a state where no diffusion pattern DFP were disposed on the lower surface of each of the comparison light guide plate LGPC and the light guide plate LGP.

According to an embodiment, the light luminance represented by the structure 1 graph Str1 shows that light leakage in the light guide plate LGP is less than that represented by the reference graph Ref that shows light leakage in the comparison light guide plate LGPC. That is, since the luminance of the leaked light was relatively low in the light guide plate LGP according to the present disclosure, an amount of the light leaking from the light guide plate LGP was relatively small.

Figure 9:
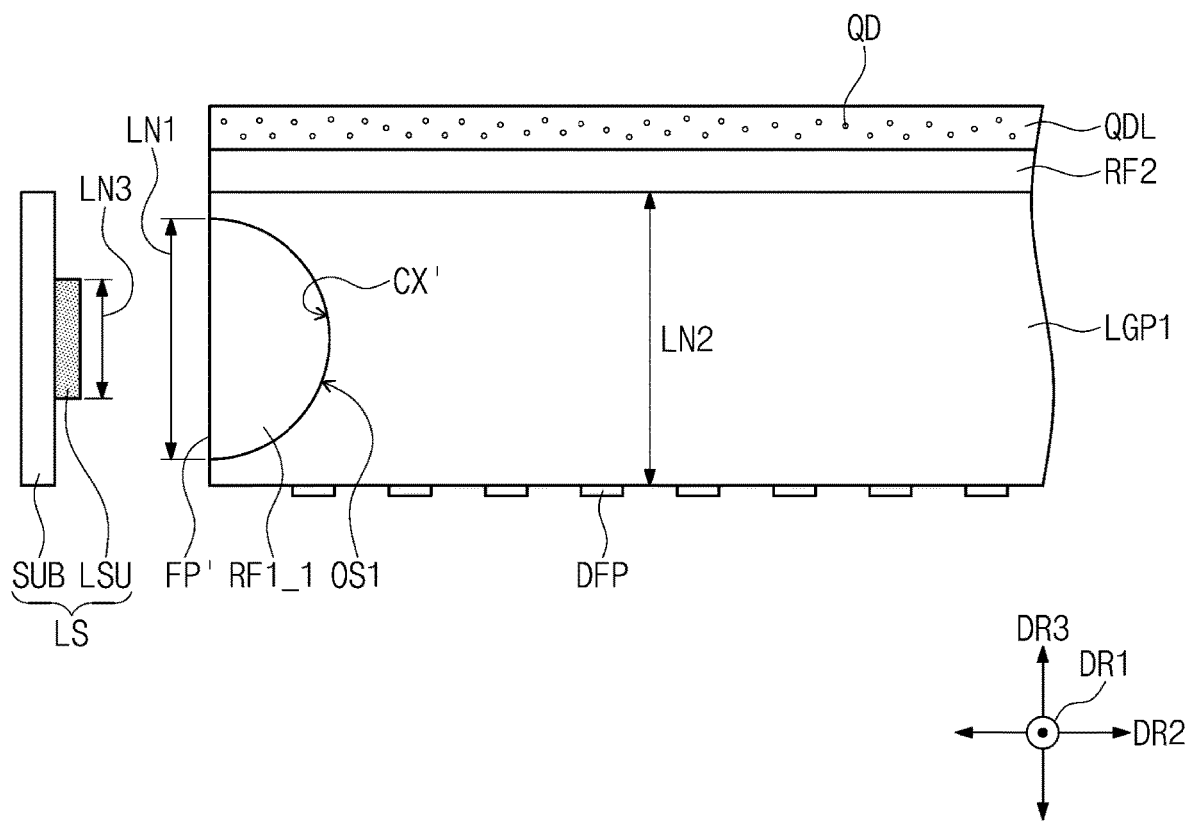
FIGS. 9 and 10 illustrate various examples of a first refractive layer.
Figure 10:
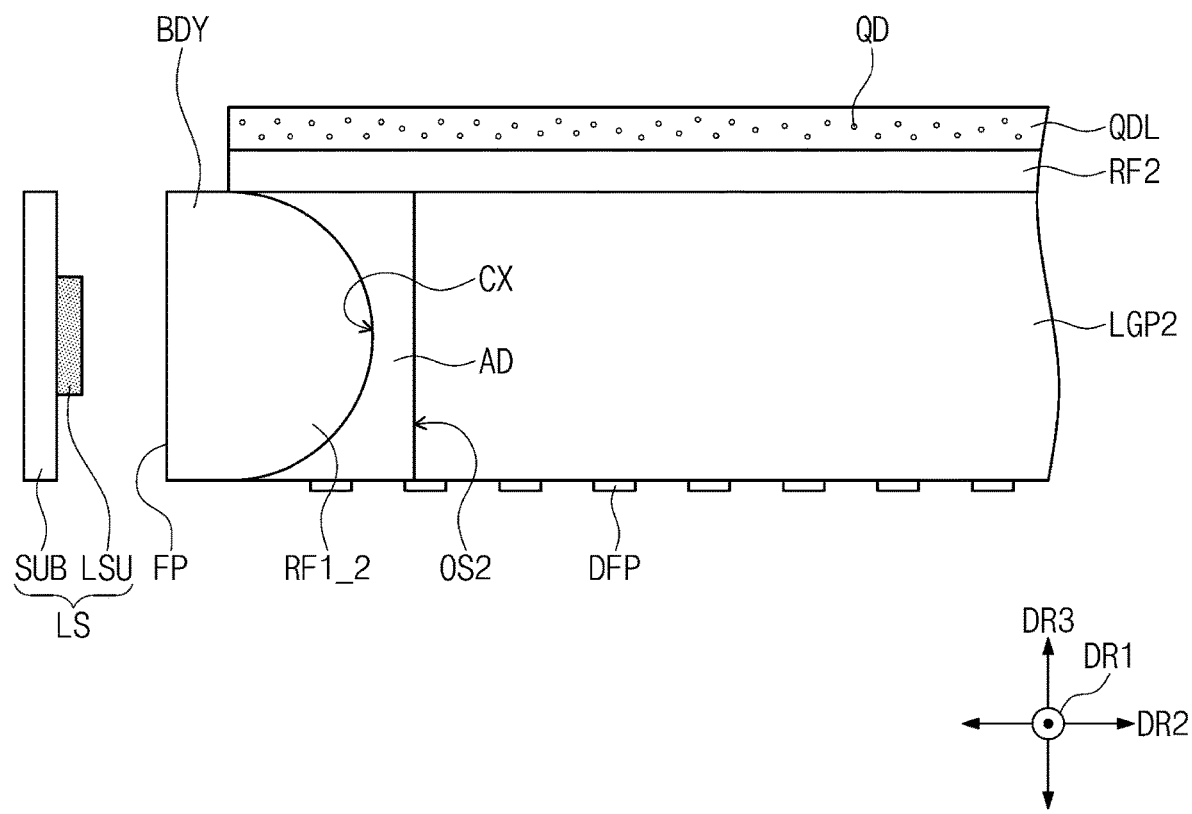

FIGS. 9 and 10 illustrate various examples of a first refractive layer.

Hereinafter, configurations of first refractive layers RF1_1 and RF1_2 that differ from the first refractive layer RF1 shown in FIG. 1, will be mainly described.

Referring to FIG. 9, according to an embodiment, a convex portion CX' of the first refractive layer RF1_1 is inserted into one side surface OS1 of a light guide plate LGP1 that has a recess shape. A first length LN1 between an upper end and a lower end of a flat portion FP' of the first refractive layer RF1_1 is less than a second length LN2 between an upper surface and a lower surface of the light guide plate LGP1 in the third direction DR3. That is, a thickness of the first refractive layer RF1_1 is less than a thickness of the light guide plate LGP1 in the third direction DR3.

When viewed in the third direction DR3, according to an embodiment, a third length LN3 between an upper end and a lower end of each of light source units LSU is less than the first length LN1. That is, a thickness of the flat portion FP' of the first refractive layer RF1_1 is greater than a thickness of each of the light source units LSU in the third direction DR3.

According to an embodiment, since the thickness of the flat portion FP' is greater than the thickness of each of the light source units LSU, a first light L1 generated by each of the light source units LSU propagates to the first refractive layer RF1_1 after passing through the flat portion FP'. Other components shown in FIG. 9 are substantially the same as those shown in FIG. 3, and thus details thereof will be omitted.

Referring to FIG. 10, according to an embodiment, the first refractive layer RF1_2 includes a convex portion CX, a flat portion FP, and a body portion BDY disposed between the convex portion CX and the flat portion FP. The body portion BDY extends in the second direction DR2 from the convex portion CX to the flat portion FP and has a constant thickness.

According to an embodiment, one side surface OS2 of a light guide plate LGP2 has a flat shape substantially parallel to the first and third directions DR1 and DR3. An adhesive member AD is disposed between the convex portion CX and the one side surface OS2 of the light guide plate LGP2. The adhesive member AD attaches the convex portion CX to the light guide plate LGP2.

According to an embodiment, the convex portion CX is inserted into the adhesive member AD after a fluidic adhesive member AD is provided on the one side surface OS2 of the light guide plate LGP2. Since the adhesive member AD is fluidic, the convex portion CX can push the adhesive member AD away while being inserted into the adhesive member AD, and the adhesive member AD will have a recessed shape that corresponds to the convex portion CX. Then, the adhesive member AD is cured, and thus the convex portion CX can be attached to the adhesive member AD. The body portion BDY and the flat portion FP are not inserted into the adhesive member AD.

According to an embodiment, the adhesive member AD has the same refractive index as that of the light guide plate LGP2. Accordingly, a first light L1 generated by a light source LS propagates similarly to FIG. 6.

Different from the light guide plate LGP shown in FIG. 1, the light guide plate LGP2 includes a glass. When the light guide plate LGP is formed of plastic, it is easy to form the recess in the first side surface OS of the light guide plate LGP when the light guide plate LGP is manufactured. However, when the light guide plate LGP2 is formed of glass, it is challenging to form the recess in the one side surface OS2 of the light guide plate LGP2. In this case, a backlight unit that prevents lightleakage can be easily manufactured by providing the adhesive member AD on the one side surface OS2 of the light guide plate LGP2 and inserting the first refractive layer RF1_2 into the adhesive member AD.

Figure 11:
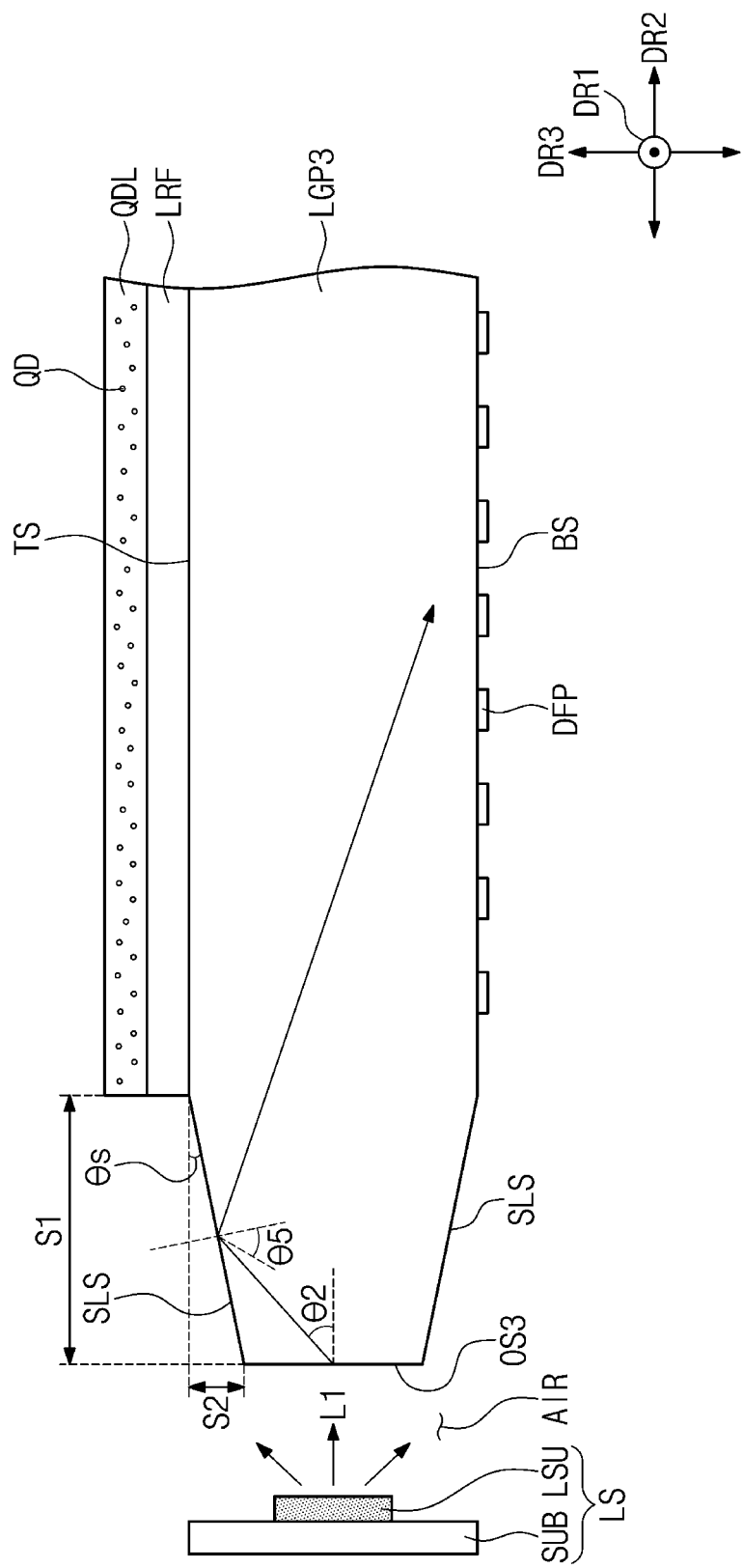
FIG. 11 illustrates a light guide plate of a display device according to an exemplary embodiment of the present disclosure.
Figure 12:
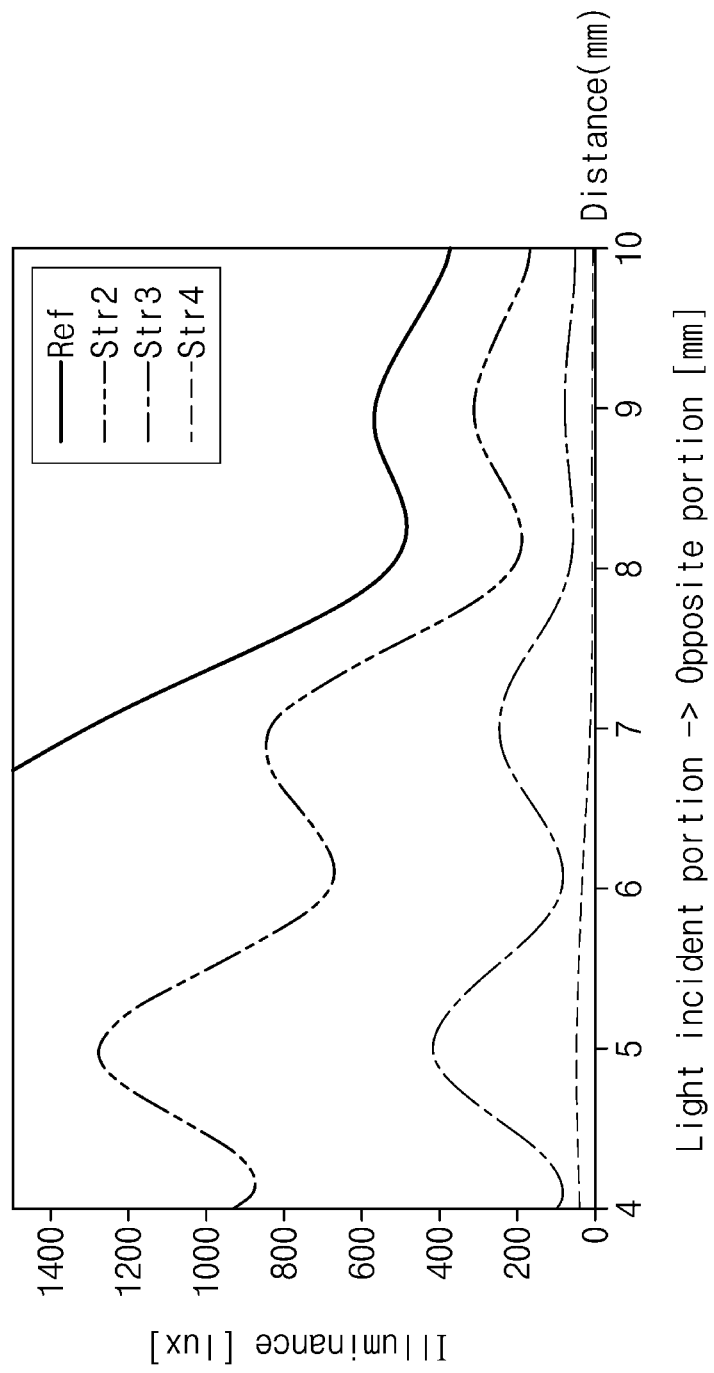
FIG. 12 is a graph of light leakage as a function of distance at various inclination surface inclination angles of a light guide plate of FIG. 11.

FIG. 11 illustrates a light guide plate LGP3 of a display device according to an exemplary embodiment of the present disclosure. FIG. 12 is a graph of light leakage as a function of distance at various inclination surface inclination angles of a light guide plate of FIG. 11.

Hereinafter, a configuration of the light guide plate LGP3 shown in FIG. 11 that differs from that of the light guide plate LGP shown in FIG. 1 will be mainly described, and in FIG. 11, the same reference numerals may denote the same elements in FIG. 1.

Referring to FIG. 11, according to an embodiment, the light guide plate LGP3 includes an upper surface TS, a lower surface BS opposite to the upper surface TS, one side surface OS3 parallel to the first direction DR1 and the third direction DR3, and inclination surfaces SLS respectively connecting an upper end of the one side surface OS3 to the upper surface TS and a lower end of the one side surface OS3 to the lower surface BS. Although two inclination surfaces SLS are shown in FIG. 11, the number of inclination surfaces SLS is not limited to two. For example, the inclination surfaces SLS that connect the lower end of the one side surface OS3 to the lower surface BS may be omitted, and the lower surface BS and the one side surface OS3 may respectively extend in the second direction DR2 and the third direction DR3 to be connected to each other.

According to an embodiment, light source units LSU are disposed to face the one side surface OS3. The one side surface OS3 has a height in the third direction that is less than a distance between the upper surface TS and the lower surface BS. A low refractive layer LRF and a light conversion layer QDL are disposed on the upper surface TS of the light guide plate LGP3. The low refractive layer LRF and the light conversion layer QDL are not disposed on the inclination surface SLS adjacent to the upper surface TS. The low refractive layer LRF has substantially the same configuration as that of the second refractive layer RF2 shown in FIG. 1.

According to an embodiment, each of the inclination surfaces SLS extends at a predetermined inclination angle $\theta s$ with respect to the upper surface TS. In detail, each of the inclination surfaces SLS forms the predetermined inclination angle $\theta s$ with the second direction DR2. The inclination angle $\theta s$ is determined by the following Equations 1.

$$\theta c = \sin^{-1}(n1/n2),\ \theta'c = \sin^{-1}(n3/n2),$$

$$\theta s = ((\theta c + \theta'c)/2) + (\pi/4) \quad \text{Equations 1:}$$

In Equations 1, "n1" denotes a refractive index of an air layer AIR, "n2" denotes a refractive index of the light guide plate LGP3, and "n3" denotes a refractive index of the low refractive layer LRF. For example, the inclination angle $\theta s$ is equal to or greater than about 4 degrees and less than about 6 degrees. The refractive index of the low refractive layer LRF is less than the refractive index of the light guide plate LGP3. For example, the refractive index of the light guide plate LGP3 is about 1.5, and the refractive index of the low refractive layer LRF is about 1.2. In this case, the inclination angle $\theta s$ is set to about 4 degrees.

According to an embodiment, in a right-angled triangle having each of the inclination surfaces SLS as its hypotenuse, a first side S1 parallel to the upper surface TS and a second side S2 parallel to the one side surface OS3 are perpendicular to each other. When the inclination angle $\theta s$ is about 4 degrees and the thickness of the light guide plate LGP3 is about 1.5 mm, the first side S1 has a length of about 2.86 mm, and the second side S2 has a length of about 0.2 mm. When viewed in the third direction DR3, a distance between the upper end and the lower end of the one side surface OS3 is greater than a distance between the upper end and the lower end of each of the light source units LSU.

According to an embodiment, a first light L1 refracted at a boundary surface between the air layer AIR and the one side surface OS3 propagates into the light guide plate LGP3 at a second angle $\theta 2$ with respect to the second direction DR2. Since the inclination surface SLS has the inclination angle $\theta s$, an incident angle of the first light L1 with respect to the inclination surface SLS adjacent to the upper surface TS is greater than a critical angle $\theta 5$ at which the light is totally reflected at a boundary surface between the inclination surface SLS and the air layer AIR. Accordingly, the first light L1 is totally reflected at the inclination surface SLS, and thus light leakage can be prevented.

Referring to FIG. 12, according to an embodiment, a reference graph Ref is obtained by measuring light leakage in the comparison light guide plate LGPC shown in FIG. 5. A structure 2 graph Str2 is obtained by measuring light leakage in the light guide plate LGP3 when the inclination angle $\theta s$ is about 15 degrees, a structure 3 graph Str3 is obtained by measuring light leakage in the light guide plate LGP3 when the inclination angle $\theta s$ is about 10 degrees, and a structure 4 graph Str4 is obtained by measuring light leakage in the light guide plate LGP3 when the inclination angle $\theta s$ is about 4 degrees.

According to an embodiment, there is less light leakage in the light guide plate LGP3 having the inclination surfaces SLS than in the comparison light guide plate LGPC, which is represented by the reference graph Ref, and light leakage in the light guide plate LGP3 having the inclination angle $\theta s$ of about 4 degrees is the least. Accordingly, leakage of the first light L1 can be prevented from occurring in the upper surface of the light guide plate LGP3 adjacent to the one side surface OS3 of the light guide plate LGP3, and thus light efficiency can be improved.

Although exemplary embodiments of the present disclosure have been described, it is understood that embodiments of the present disclosure should not be limited to exemplary embodiments but that various changes and modifications can be made by one ordinary skilled in the art within the spirit and scope of embodiments of the present disclosure as hereinafter claimed. Therefore, the disclosed subject matter should not be limited to any exemplary embodiment described herein, and the scope of embodiments of the present inventive concept shall be determined according to the attached claims.

What is claimed is:
1. A display device comprising:
a display panel;
a light guide plate disposed under the display panel;
a light source disposed adjacent to one side surface of the light guide plate and that generates a first light;

a first refractive layer disposed between the light source and the one side surface of the light guide plate that has a refractive index greater than a refractive index of the light guide plate; and a second refractive layer disposed between the display panel and the light guide plate that has a refractive index less than the refractive index of the light guide plate, wherein the first refractive layer comprises a convex portion that protrudes into the one side surface of the light guide plate.

2. The display device of claim 1, wherein the first refractive layer extends along the one side surface of the light guide plate and has a semi-circular cross-sectional shape.

3. The display device of claim 1, wherein the one side surface of the light guide plate has a concave shaped recess, and the convex portion of the first refractive layer protrudes into the recess.

4. The display device of claim 3, wherein the convex portion has a curvature that is the same as a curvature of the concave shaped recess.

5. The display device of claim 1, wherein the refractive index of the first refractive layer is about 1.8, the refractive index of the light guide plate is about 1.5, and the refractive index of the second refractive layer is about 1.25.

6. The display device of claim 5, wherein the first light that propagates to a boundary surface between the light guide plate and the second refractive layer after passing through the first refractive layer has an incident angle with respect to the boundary surface that is greater than a critical angle at which the first light is totally reflected at the boundary surface.

7. The display device of claim 1, wherein the first refractive layer further comprises a flat portion that is opposite to the convex portion, an upper surface and a lower surface of the light guide plate are substantially parallel to a first direction and a second direction that crosses the first direction, and the flat portion comprises a planar surface substantially parallel to the second direction and a third direction that is perpendicular to the upper surface of the light guide plate.

8. The display device of claim 7, wherein a first distance in the third direction between an upper end and a lower end of the flat portion is less than or equal to a second distance in the third direction between the upper surface and the lower surface of the light guide plate.

9. The display device of claim 8, wherein the light source comprises:

a light source substrate; and a plurality of light source units disposed on the light source substrate and that face the flat portion, and a third distance in the third direction between an upper end and a lower end of each of the light source units is less than the first distance.

10. The display device of claim 7, further comprising a plurality of diffusion patterns disposed on the lower surface of the light guide plate.

11. The display device of claim 7, further comprising a light conversion layer disposed between the display panel and the second refractive layer that converts the first light into a second light.

12. The display device of claim 11, wherein the flat portion is coplanar with one side surface of the second refractive layer and one side surface of the light conversion layer.

13. The display device of claim 11, wherein the first light is blue, and the second light is white.

14. The display device of claim 7, further comprising an adhesive member disposed between the first refractive layer and the one side surface of the light guide plate that has a refractive index equal to the refractive index of the light guide plate, wherein the first refractive layer further comprises a body portion disposed between the convex portion and the flat portion that extends in the second direction from the flat portion to the convex portion, the one side surface of the light guide plate has a flat shape parallel to the first and third directions, and the adhesive member is disposed between the convex portion and the one side surface of the light guide plate.

15. A display device comprising:

a display panel;

a light guide plate disposed under the display panel and that comprises an upper surface, a lower surface, one side surface, and an inclination surface that connects an upper end of the one side surface to the upper surface;

a low refractive layer disposed on the upper surface of the light guide plate between the display panel and the light guide plate and that has a refractive index less than a refractive index of the light guide plate; and a light source disposed adjacent to the one side surface of the light guide plate that generates a first light, wherein the one side surface has a height that is less than a distance between the upper surface and the lower surface, and an inclination angle θs between the upper surface and the inclination surface is determined by the following Equations of $\theta c=\sin^{-1}(n1/n2)$, $\theta'c=(n3/n2)$, and $\theta s=((\theta c+\theta'c)/2)+(\pi/4)$, wherein "n1" denotes a refractive index of an air layer, "n2" denotes the refractive index of the light guide plate, and "n3" denotes the refractive index of the low refractive layer.

16. The display device of claim 15, wherein the inclination angle is equal to or greater than about 4 degrees and less than about 6 degrees.

17. The display device of claim 15, wherein the inclination angle is about 4 degrees, a length of a first side parallel to the upper surface of a right-angled triangle having the inclination surface as a hypotenuse thereof is about 2.86 mm, and a length of a second side parallel to the one side surface and perpendicular to the first side is about 0.2 mm.

18. The display device of claim 15, wherein the light source comprises:

a light source substrate; and a plurality of light source units disposed on the light source substrate that face the one side surface, and a distance between an upper end and a lower end of the one side surface is greater than a distance between an upper end and a lower end of each of the light source units.

19. A backlight unit comprising:

a light guide plate that includes one side surface with a concave shaped recess;

a light source disposed adjacent to the one side surface of the light guide plate that generates a first light;

a first refractive layer disposed between the light source and the one side surface of the light guide plate that has a refractive index greater than a refractive index of the light guide plate; and a second refractive layer disposed on the light guide plate that has a refractive index less than the refractive index of the light guide plate, wherein the first refractive layer comprises a convex portion that protrudes into the concave shaped recess of the one side surface of the light guide plate.

20. The backlight unit of claim 19, wherein the first refractive layer further comprises a flat portion that is opposite to the convex portion, an upper surface and a lower surface of the light guide plate are substantially parallel to a first direction and a second direction that crosses the first direction, the flat portion comprises a planar surface substantially parallel to the second direction and a third direction that is perpendicular to the upper surface of the light guide plate, and a first distance in the third direction between an upper end and a lower end of the flat portion is less than or equal to a second distance in the third direction between the upper surface and the lower surface of the light guide plate.

* * * * *